United States Patent Office 3,336,394
Patented Aug. 15, 1967

3,336,394
ALPHA AND BETA UNSATURATED SULFOXIDE
AND PROCESS FOR ITS PRODUCTION
Warren Irl Lyness, Mount Healthy, and David Evans
O'Connor, Springfield Township, Hamilton County,
Ohio, assignors to The Procter & Gamble Company,
Cincinnati, Ohio, a corporation of Ohio
No Drawing. Filed Sept. 30, 1964, Ser. No. 400,581
4 Claims. (Cl. 260—607)

This invention relates to a process for the production of novel mixtures of unsaturated sulfides, sulfoxides and sulfones having a high percentage of beta, gamma unsaturation relative to the amount of alpha-beta unsaturation; the unsaturated sulfides, sulfoxides and sulfones themselves; and a process for preparing allylic alcohols utilizing the aforementioned unsaturated sulfoxides as starting materials.

The prior art contains many references to base-catalyzed isomerization reactions of olefins containing various groups such as ester groups, carboxylic acid groups, nitrile groups and keto groups. In all of these isomerization reactions, the percentage of alpha-beta unsaturation is very high (>68%; >90% in many instances) relative to the amount of beta-unsaturation. It would be useful, of course, to be able to predetermine the position of a reactive site in a hydrocarbon chain. However, the prior art has never been able to position a substantial amount of unsaturation in the beta-gamma position. Beta-gamma unsaturation is more desirable than $\alpha$-$\beta$, for example, because it is less reactive. For instance, it is known that the alpha-beta unsaturated sulfones will undergo Michael condensation reactions.

Accordingly, it is an object of this invention to prepare mixtures of unsaturated sulfides, sulfoxides and sulfones having a high percentage of beta-gamma unsaturation.

It is another object of this invention to prepare allylic alcohols utilizing the novel unsaturated sulfoxide mixtures of this invention.

The above objects and other objects can be achieved by reacting a compound having the following formula:

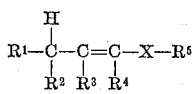

wherein $R^1$ and $R^5$ are each selected from the group consisting of alkyl, aryl, alkyl aryl and aryl alkyl hydrocarbon groups containing from 1 to about 20 carbon atoms; $R^2$, $R^3$ and $R^4$ are each selected from the group consisting of hydrogen and alkyl hydrocarbon groups containing from 1 to about 6 carbon atoms; and X is selected from the group consisting of sulfur, sulfoxide and sulfone groups

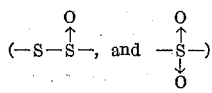

the total number of carbons in the compound being from 5 to about 28 carbon atoms, with a strong base selected from the group consisting of sodium and potassium (a) t-amyloxides, (b) t-butoxides and (c) methylsulfinyl carbanion salts in the presence of a solvent selected from the group consisting of (a) t-butyl alcohol, (b) t-amyl alcohol and (c) dimethyl sulfoxide with the solvent selected so that said carbanion salts are used only with dimethyl sulfoxide, said reaction taking place at a temperature of from about 20° C. to about 90° C. This is reaction A. The product of this reaction is an equilibrium mixture of alpha-beta and beta-gamma unsaturated compounds having the formulas

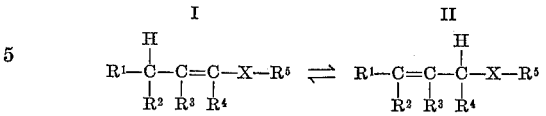

wherein the percent of isomer II is higher than about 33%. $R^1$, $R^2$, $R^3$, $R^4$, $R^5$, and X in the above formulas have the meanings hereinbefore given.

The precentage of beta-gamma unsaturation in the equilibrium mixtures formed in reaction A will vary upwards from 33% to about 100%, depending upon several factors. In general, the amount of beta-gamma unsaturation will be greater for sulfones than for sulfoxides and greater for sulfoxides than for sulfides. A higher percentage of beta-gamma unsaturation occurs when both $R^1$ and $R^2$ are hydrocarbon groups. When $R^3$ is a hydrocarbon group the effect is marginally in favor of increased beta-gamma concentration. When $R^4$ is a hydrocarbon group the amount of beta-gamma unsaturation is diminished from the amount of beta-gamma unsaturation when $R^4$ is hydrogen.

Preferably, in all the reactions and products of this invention, $R^2$, $R^3$ and $R^4$ are hydrogen atoms since in general the reaction will proceed more readily and the materials are more readily available. Preferably also, $R^5$ is a methyl group since such compounds generally are more available. Similarly it is preferred that X be a sulfone or sulfoxide group since these groups will give higher percentages of beta-gamma unsaturation than the sulfide group. These preferred substituents result in high proportions of beta-gamma unsaturation in the reaction products relative to the amount of beta-gamma unsaturation taught by the prior art.

The equilibrium mixture of unsaturated compounds hereinbefore described when X is a sulfoxide group can also be prepared by a different route, reaction B, by starting with a compound having the formula

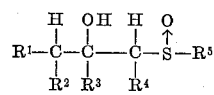

wherein $R^1$, $R^2$, $R^3$, $R^4$, and $R^5$ have the meanings hereinbefore described. This compound, when reacted with a strong base hereinbefore described, in an amount in excess of an equimolar base:sulfoxide ratio, in the solvents hereinbefore described at a temperature of from about 40° C. to about 90° C., will undergo an elimination reaction to form the equilibrium mixture of alpha-beta and beta-gamma unsaturated sulfoxides hereinbefore described. It is postulated that reaction B proceeds by a base catalyzed elimination of water to form an alpha-beta unsaturated sulfoxide which then reacts by forming an intermediate anion having the formula

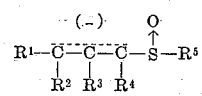

which upon protonation forms the mixtures of unsaturated sulfoxides hereinbefore described. There must be at least as many moles of strong base as there are moles of sulfoxide since the hydroxyl group destroys a molecule of strong base when it is removed.

The alpha-beta unsaturated sulfides, sulfoxides and fulfones used as starting materials in the first described reaction of this invention, can be prepared in known ways as, for example, by utilizing the method described by E. P. Kohler and H. Potter in the Journal of the American Chemical Society, volume 57, page 1316 (1935).

The unsaturated sulfoxide equilibrium mixture hereinbefore described can be made to undergo further reaction, reaction C, to form allyl alcohols having the formula

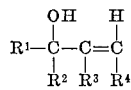

wherein $R^1$, $R^2$, $R^3$, and $R^4$, have the meanings hereinbefore described, by reacting the aforesaid sulfoxides with a strong base selected from the group consisting of sodium and potassium t-amyloxides, t-butoxides, mixtures thereof, and mixtures of the aforesaid alkoxides with sodium or potassium hydroxides in solvent selected from the group consisting of monohydric alcohols having aliphatic chains containing from 1 to about 6 carbon atoms; benzene; toluene; xylenes; diethyl ether; dibutyl ether; anisole; diphenyl ether; tetrahydrofuran; 1,2-dimethoxyethane; diethylene glycol dimethyl ether; butylamine; N-methylbutylamine; anhydrous ethylenediamine; pyridine; morpholine; anhydrous liquid ammonia; N,N-dimethyl formamide, and mixtures thereof. Choice of a particular solvent is dependent upon its ability to dissolve at least one of, and preferably both of, the reactants. Mixtures of sodium or potassium t-butoxides and hydroxides are preferred, in the molar proportions of 2:1 to 1:2 of butoxide to hydroxide. t-butyl alcohol, t-amyl alcohol and mixtures thereof are preferred solvents.

The temperature of reaction C is from about 30° C. to about 90° C., preferably from about 50° C. to about 70° C. Reaction C is a base catalyzed elimination reaction in which the compound is cleaved adjacent to the sulfoxide group.

Specific examples of $R^1$ and $R^5$ alkyl groups as defined hereinbefore include methyl, ethyl, propyl, isopropyl, butyl, t-butyl, pentyl, hexyl, heptyl, octyl, nonyl, decyl, undecyl, dodecyl, tridecyl, tetradecyl, pentadecyl, hexadecyl, heptadecyl, and octadecyl groups. The $R^2$, $R^3$ and $R^4$ alkyl groups are the $C_1$–$C_6$ members of the above lists. Suitable $R^1$ and $R^5$ aryl groups include phenyl and naphthyl groups. Combinations of the above $R^1$ and $R^5$ groups including chemical combinations thereof (alkyl aryl and aryl alkyl groups) and straight chained or branched isomers of the above groups can be used and are within the scope of this invention. These groups can be derived from naturally occurring sources such as triglycerides (e.g., coconut oil and tallow) or from petroleum hydrocarbons. The source is not important for the purpose of this invention.

The unsaturated sulfide, sulfoxide and sulfone equilibrium mixtures of this invention are all either surface active agents per se or are useful as intermediates in the preparation of surface active agents. The unsaturated allyl alcohols prepared by the process of this invention (reaction C) are useful intermediates in the preparation of a wide variety of compounds including the surface active agents.

The following examples illustrate, but are not intended to limit in any way, the practice of this invention.

EXAMPLE I

Reaction B

A solution of potassium t-butoxide in t-butyl alcohol was prepared from 2.7 g. (0.007 mole) of potassium metal and 100 ml. of t-butyl alcohol. 11.7 g. (0.5 mole) of 1-methyl-sulfinyl-2-hydroxyundecane was added to the above solution and the reaction mixture was stirred for five hours while the temperature of the reaction mixture was maintained at about 60° C. After the reaction was completed, the reaction mixture was poured into 200 ml. of cold water, and 1.0 g. of 3-hydroxy-1-undecene was separated by extraction with ethyl acetate, evaporation of the solvent and distillation of the residue. Further distillation gave 4.9 g. (45% yield) of product which was primarily 1-methylsulfinyl-2-undecene, B.P. 113–114° C. (0.1 mm.). A nuclear magnetic resonance (n.m.r.) spectrum was obtained for this latter material. The spectrum had absorption bands centered at 4.4 (area 2.0) (vinyl protons); 6.6 (area 1.7) (C=C—CH₂—SO—); 7.55 (area 2.9) (methylsulfinyl protons); 7.8–8.0 (area 2.0) (allyl protons); and 8.7 and 9.1 (area 15.0) (alkyl chain protons). Analysis of the vinyl proton region showed that 4% of this material was alpha-beta unsaturated (1-methylsulfinyl-1-undecene) and 94% beta-gamma unsaturated (1-methylsulfinyl-2-undecene). There was about 2% of other isomers.

When, in the above reaction, sodium and/or potassium t-amyloxides in either t-amyl alcohol, t-butyl alcohol or dimethyl sulfoxide or mixtures thereof; potassium and/or sodium methylsudfinyl carbanion salts in dimethyl sulfoxide; or sodium and/or potassium t-butoxides in t-amyl alcohol, dimethyl sulfoxide or mixtures thereof are substituted either wholly or in part for the strong base and solvent system in the above reaction, essentially equivalent results are obtained in that mixtures of unsaturated sulfoxides having a high percentage of beta-gamma unsaturation are produced.

EXAMPLE II

Recation B

A solution of potassium t-butoxide (0.1 mole) in 200 ml. of t-butyl alcohol was prepared and to this solution was added 13.6 g. (0.1 mole) of 1-methylsulfinyl-2-hydoxybutane. The reaction mixture was stirred for three hours while the temperature was maintained at about 60° C. and the reaction mixture was then poured into 100 ml. of ice water. The t-butyl alcohol was evaporated and the residue was extracted with ethyl acetate, the extract was dried over magnesium sulfate, the solvent was evaporated and the residue was distilled. 5.4 g. (46%) of product which was primarily 1-methylsulfinyl-2-butane, B.P. 62° C. (0.2 mm.) was obtained. Analysis of the vinyl proton region of the n.m.r. spectrum indicated that only 3% of the alpha-beta unsaturated isomer (1-methylsulfinyl-1-butene) was present the rest being the beta-gamma isomer (1-methylsulfinyl-2-butene).

When, in the above reaction, either 1-hexylsulfinyl-2-hydroxy-7-phenylheptane; 1 - phenylsulfinyl-2-hydroxy-3-nonylphenylpropane; 1 - hexylphenylsulfinyl-2-hydroxy-3 - naphthylpropane; 1-methylsulfinyl-2-hydroxy-2,3-dimethylpentane; 1 - naphthylmethylsulfinyl-2-hydroxy-2-hexyldecane; or 2 - methylsulfinyl-3-hydroxyoctane are substituted for the 1-methylsulfinyl-2-hydroxybutane, substantially equivalent results are obtained in that corresponding mixtures of unsaturated sulfoxides are produced which are high in beta-gamma unsaturation. The corresponding mixtures are defined as follows:

Equilibrium mixtures of isomers having at least about 90% of the following isomers 1-hexylsulfinyl-7-phenyl-2-heptene;
1-phenylsulfinyl-3-nonylphenyl-2-propene;
1-hexylphenylsulfinyl-3-naphthyl-2-propene;
1-methylsulfinyl-2,3-dimethyl-2-pentene;
1-naphthylmethylsulfinyl-2-hexyl-2-decene; and
2-methylsulfinyl-3-octene which contain unsaturation at the beta-gamma position with respect to the sulfinyl group, the rest of the mixtures being the isomers containing unsaturation at the alpha-beta position with respect to the sulfinyl group.

EXAMPLE III

Reaction A 2.0 g. of 1-methylmercapto-1-dodecene were added to a solution of 2.0 g. (0.016 mole) of potassium t-butoxide in 40 ml. of dimethyl sulfoxide. The reaction was allowed to proceed for 30 minutes at room temperature and the reaction mixture was then distilled to remove dienes, resulting in an 82% recovery of sulfoxides. Analysis of the distillate by gas chromotography indicated the composition to be 25% cis alpha-beta, 41% trans alpha-beta (alpha-beta sulfides are 1-methylmercapto-1-dodecene) and 34% beta-gamma (1-methylmercapto-2-dodecene) unsaturated sulfides. Analysis of the same material by oxidative cleavage of the double bond indicated 65% alpha-beta unsaturated, 34% beta-gamma unsaturated and 1% other unsaturated isomers.

When, in the above reaction, soduim and/or potassium t-amyloxide and/or sodium t-butoxide in either t-amyl alcohol, t-butyl alcohol, dimethyl sulfoxide or mixtures thereof; or sodium or potassium methylsulfinyl carbanion salts in dimethyl sulfoxide are substituted either wholly or in part for potassium t-butoxide and dimethyl sulfoxide respectively as the strong base and solvent system, substantially equivalent results are obtained in that the percentage of beta-gamma unsaturation in the above unsaturated compound is increased over that amount of beta-gamma unsaturation present in the starting material.

Also in the above reaction when either 1-hexylmercapto - 6 - phenyl-1-hexene; 1-phenylmercapto-3-nonylphenyl-1-propene; 1 - hexylphenylmercapto-3-naphthyl-1-propene; 1 - methylmercapto-2,3-dimethyl-1-propene; 1-naphthylmethylmercapto-2-hexyl-1-decene; or 2 - methyl mercapto-2-octene are substituted for the 1-methylmercapto-1-dodcene substantially equivalent results are obtained in that corresponding mixtures of unsaturated sulfoxides are produced which are high in beta-gamma unsaturation. The corresponding mixtures are defined as follows:

Equilibrium mixtures of isomers having at least 33% of the following isomers 1-hexylmercapto-7-phenyl-2-heptene;
1-phenylmercapto-3-nonylphenyl-2-propene;
1-hexylphenylmercapto-3-naphthyl-2-propene;
1-methylmercapto-2,3-dimethyl-2-pentene;
1-naphthylmethylmercapto-2-hexyl-2-decene; and
2-methylmercapto-3-octene which contain unsaturation at the beta-gamma position with respect to the mercapto group, the rest of the mixtures being the isomers containing unsaturation at the alpha-beta position with respect to the mercapto group.

EXAMPLE IV

Reaction A 10.0 g. (0.0435 mole) of 1-methylsulfinyl-1-dodcene was added to a solution of 0.0125 mole of potassium t-butoxide in 200 ml. of t-butyl alcohol. The reaction mixture was stirred for five hours at room temperature and then was poured into 300 ml. of water. The sulfoxide was extracted with ethyl acetate. The extracts were dried and the solvent was evaporated. Distillation of the residue yielded 8.5 g. of unsaturated sulfoxide, B.P. 131–137° C. (0.1 mm.). Analysis of the vinyl proton region of the n.m.r. spectrum indicated that the material consisted of 4% alpha-beta unsaturated isomer and 96% of beta-gamma unsaturated isomer of the original starting material.

When, in the above reaction, sodium and/or potassium t-amyloxides in either t-amyl alcohol, t-butyl alcohol or dimethyl sulfoxide or mixtures thereof (either wholly, or in part); potassium and/or sodium methylsulfinyl carbanion salts in dimethyl sulfoxide; or sodium and/or potassium t-butoxides in t-amyl alcohol, dimethyl sulfoxide or mixtures thereof (either wholly or in part) are substituted for the strong base and solvent system in the above reaction, essentially equivalent results are obtained in that mixtures of unsaturated sulfoxides having a high percentage of beta-gamma unsaturation are produced.

When, in the above reaction, 1-hexylsulfinyl-6-phenyl-1-hexene; 1 - phenylsulfinyl-3-nonylphenyl-1-propene; 1-hexylphenylsulfinyl - 3 - naphthyl-1-propene; 1-methylsulfinyl-2,3-dimethyl-1-propene; 1-naphthylmethylsulfinyl-2-hexyl-1-decene; or 2-methylsulfinyl-2-octene are substituted for the 1-methylsulfinyl-1-dodecene, substantially equivalent results are obtained in that the corresponding mixtures of sulfoxides which are high in beta-gamma unsaturation are produced.

EXAMPLE V 0.1 g. of potassium was added to 20 ml. of t-butyl alcohol to form a solution of potassium t-butoxide in t-butyl alcohol. 1.0 gm. of 1-methylsulfonyl-1-hexene was added to this solution and the reaction mixture was stirred for five hours at room temperature (approximately 28° C.). The reaction mixture was then poured into water and the product was extracted with ethyl acetate, the extracts were dried, and the solvent was evaporated to yield 0.9 g. of recovered material. An n.m.r. spectrum showed this material to be primarily (>99%) 1-methylsulfonyl-2-hexene (vinyl proton absorption at 4.0–4.8). There was less than 1% of the $\alpha,\beta$-unsaturated isomer present.

When in the above reaction, sodium and/or potassium t-amyloxides in either t-amyl alcohol, t-butyl alcohol or dimethyl sulfoxide or mixtures thereof; potassium and/or sodium methylsulfinyl carbanion salts in dimethyl sulfoxide; or sodium and/or potassium t-butoxides in t-amyl alcohol, dimethyl sulfoxide or mixtures thereof are substituted either wholly or in part for the strong base and solvent system in the above reaction, essentially equivalent results are obtained in that mixtures of unsaturated sulfones having a high percentage of beta-gamma unsaturation are produced.

When, in the above reaction, 1-hexylsulfonyl-6-phenyl-1-hexene; 1-phenylsulfonyl-3-nonylphenyl-1-propene; 1-hexylphenylsulfonyl-3-naphthyl-1-propene; 1 - methylsulfonyl-2,3-dimethyl-1-propene; 1-naphthylmethylsulfonyl-2-hexyl-1-decene; or 2-methylsulfonyl-2-octene are substituted for the 1-methylsulfonyl-1-hexene, substantially equivalent results are obtained in that the corresponding mixtures of sulfones which are high in beta-gamma unsaturation are produced. The corresponding mixtures are defined as follows:

Equilibrium mixtures of isomers having at least about 90% of the following isomers 1-hexylsulfonyl-7-phenyl-2-heptene;
1-phenylsulfonyl-3-nonylphenyl-2-propene;
1-hexylphenylsulfonyl-3-naphthyl-2-propene;
1-methylsulfonyl-2,3-dimethyl-2-pentene;
1-naphthylmethylsulfonyl-2-hexyl-2-decene; and
2-methylsulfonyl-3-octene which contain unsaturation at the beta-gamma position with respect to the sulfonyl group, the rest of the mixtures being the isomers containing unsaturation at the alpha-beta position with respect to the sulfonyl group.

EXAMPLE VI

Reaction C

Potassium (3.9 g.; 0.1 mole) was added to 100 ml. of t-butyl alcohol to form a solution of potassium t-butoxide in t-butyl alcohol. The solution was heated to about 60° C. and 6.0 g. (0.026 mole) of 1-methylsulfinyl-1-dodecene was added. (At this point the sulfoxide in the solution was primarily 1-methylsulfinyl-2-dodecene (~96%) since equilibrium was rapidly established.) The reaction mixture was stirred for about five hours at 60° C. after which it was poured into water and extracted with hexane. The hexane was dried and evaporated to yield about 5.4 g. of crude residue which was distilled to give about 0.4 g. of 3-hydroxy-1-dodecene, 2.6 g. of starting material, and 0.6 gm. of a mixture of the two.

A similar reaction using the same quantities was run in which 0.9 g. (0.05 mole) of water was added to the solution of potassium t-butoxide in t-butyl alcohol to give an approximately equimolar mixture of potassium t-butoxide and hydroxide. The reaction mixture was maintained at 60° C. for about 24 hours to give about 3 g. of 3-hydroxy-1-dodecene and 1.0 g. of recovered starting material.

When, in the above reaction, 1-hexylsulfinyl-6-phenyl-1-hexene; 1 - phenylsulfinyl-3-nonylphenyl - 1 - propene; 1-hexylphenylsulfinyl-3-naphthyl - 1 - propene; 1-methylsulfinyl-2,3-dimethyl-1-propene; 1-naphthylmethylsulfinyl-2-hexyl-1-decene; or 2-methylsulfinyl-2-octene are substituted for the 1-methylsulfinyl-1-dodecene, substantially equivalent results are obtained in that the corresponding unsaturated alcohols are obtained.

When, in the above reaction, potassium and/or sodium t-amyloxides and/or sodium t-butoxide and mixtures of these alkoxides with sodium and/or potassium hydroxides in equi-molar quantities in methyl alcohol, ethyl alcohol, isopropyl alcohol, butyl alcohol, t-amyl acohol, benzene, toluene, xylene, diethyl ether, dibutyl, ether, anisole, diphenyl ether, tetrahydrofuran, 1,2-dimethoxyethane, diethylene glycol dimethyl ether, butylamine, N-ethyl-butylamine, anhydrous ethylenediamine, pyridine, morpholine, anhydrous liquid ammonia, N,N-dimethyl formamide, or mixtures thereof are substituted for the base-solvent systems in the above reactions, substantially equivalent results are obtained in that 3-hydroxy-1-dodecene is produced.

What is claimed is:

1. Mixtures of compounds having the formula

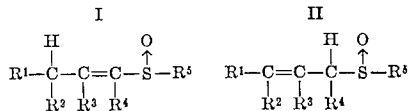

wherein $R^1$ and $R^5$ are each selected from the group consisting of alkyl, phenyl, alkyl phenyl and aryl alkyl hydrocarbon groups containing from 1 to 20 carbon atoms wherein said aryl moiety is selected from the group consisting of phenyl and naphthyl moieties; $R^2$, $R^3$, and $R^4$ are each selected from the group consisting of alkyl hydrocarbon groups containing from 1 to 6 carbon atoms and hydrogen; the total number of carbon atoms in the compound being from 5 to 28 carbon atoms; and the percentage of isomer II being at least 33% of the total.

2. The mixture of compounds of claim 1 in which $R^2$, $R^3$, and $R^4$ are hydrogen atoms and $R^5$ is a methyl group.

3. A process for the production of novel mixtures of compounds having the formulas:

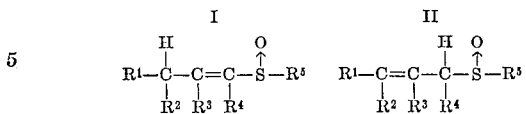

wherein $R^1$ and $R^5$ are each selected from the group consisting of alkyl, phenyl, alkyl phenyl and aryl alkyl hydrocarbon groups containing from 1 to 20 carbon atoms; wherein said aryl moiety is selected from the group consisting of phenyl and naphthyl moieties; $R^2$, $R^3$, and $R^4$ are each selected from the group consisting of alkyl hydrocarbon groups containing from 1 to 6 carbon atoms and hydrogen; the total number of carbons in the compound being from 5 to 28 carbon atoms; and the percentage of isomer II being at least 33% of the total, said process comprising reacting a compound having the formula:

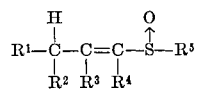

wherein $R^1$, $R^2$, $R^3$, $R^4$, and $R^5$ have the meanings hereinbefore given, with a strong base selected from the group consisting of sodium potassium (a) t-amyloxides, (b) t-butoxides and (c) methylsulfinyl carbanion salts in the presence of a solvent selected from the group consisting of (a) t-butyl alcohol, (b) t-amyl alcohol and (c) dimethyl sulfoxide with the solvent selected so that said carbanion salts are used only with dimethyl sulfoxide, said reaction taking place at a temperature of from about 20° C. to 90° C.

4. The process of claim 3 in which $R^2$, $R^3$, and $R^4$ are hydrogen atoms and $R^5$ is a methyl group.

References Cited

Price et al.: Journal American Chemical Society, vol. 75, pp. 4750–4751.

Tarbell et al.: Journal American Chemical Society, vol. 78, pp. 2259–2264.

CHARLES B. PARKER, *Primary Examiner.*

D. R. PHILLIPS, *Assistant Examiner.*